United States Patent
Pyun

(10) Patent No.: US 6,264,875 B1
(45) Date of Patent: Jul. 24, 2001

(54) PREPARATION OF MULTI-PURPOSE MAGNETIZED AND SINTERED CERAMICS

(76) Inventor: Sang-Yool Pyun, 8501 Bando-Bore Ville, 49-6 Namohon, 1-Dong, Sooyoung-ku, Pusan (KR)

( * ) Notice: Subject to any disclaimer, the term of this patent is extended or adjusted under 35 U.S.C. 154(b) by 0 days.

(21) Appl. No.: 09/460,525

(22) Filed: Dec. 14, 1999

(30) Foreign Application Priority Data

Aug. 30, 1999 (KR) .................................. 99-36410

(51) Int. Cl.⁷ .................................. C04B 35/16
(52) U.S. Cl. .......................... 264/428; 264/430; 264/434; 252/62.55; 252/62.56; 252/62.58; 252/62.59; 252/62.6; 252/62.63; 252/62.64
(58) Field of Search .................... 264/428, 430, 264/434; 252/62.55, 62.56, 62.58, 62.59, 62.6, 62.63, 62.64

(56) References Cited

U.S. PATENT DOCUMENTS 5,769,971 * 6/1998 Kuroda et al. ..................... 252/62.55
5,911,941 * 6/1999 Rokhvarger et al. ................ 264/434

FOREIGN PATENT DOCUMENTS 97-59144 * 8/1997 (KR) .

OTHER PUBLICATIONS

Abstract of JP 78044928 B, Nov. 1974.*

Abstract of JP 01299691 A, Dec. 1989.*

* cited by examiner

*Primary Examiner*—James Derrington
(74) *Attorney, Agent, or Firm*—Jacobson Holman PLLC

(57) ABSTRACT

The present invention relates to a method for preparing multi-purpose magnetized and sintered ceramics, comprising the steps of adding water to a mixture of Maek-Ban Stone and soft sericite, stirring and maturing at a room temperature, sintering, and irradiating with a magnetic field. The ceramics obtained by the present invention produce various effects such as keeping food fresh, deodorization and purification.

4 Claims, No Drawings

PREPARATION OF MULTI-PURPOSE MAGNETIZED AND SINTERED CERAMICS

BACKGROUND OF THE INVENTION

Technical Field and Prior Art of Invention

The present invention relates to the preparation of multi-purpose magnetized and sintered ceramics, more specifically, to ceramics having functions of bio-activity, including keeping food fresh, and purifying waste water.

Currently, a physically or chemically treated natural ore is used for promotion of health and bio-activation as well as industrialization extended to such uses as medical subjects, water purification and architectural materials.

There are many examples of the effects of wavelengths slightly longer than infrared, referred to herein as far-IR, from installing molded and sintered ceramics onto floors of a car or living room, in which far-IR radiated from the ceramics can promote human metabolism to prevent diseases; to putting the ceramics into aquariums or a fish farm, where far-IR can accelerate the growth of fishes and prevent fish diseases; to putting the ceramics into a refrigerator, where far-IR can keep foods such as vegetables and fruits fresh for a long period. In addition, applying these ceramics to kitchenware, original food taste and nutrition may be kept longer.

Main materials for the above-mentioned ceramics are mostly Maek-Ban Stone (far-IR emitting stone; similar with a shape of barley) and soft sericite with other various constituents. As an example, Japanese Pat. No. Hei 1-299691, in which a method for preparing ceramic materials is that of adding silica and alumina into powder of Maek-Ban Stone(80–90% by weight), consisting of silicon anhydride, aluminum oxide, titanium oxide, magnesium oxide, potassium oxide, sodium oxide and manganese anhydride, and pulverizing it and adding water glass to it and molding and sintering it at the temperature of 1,400–1,600° C. to yield the final ceramic product; this final product is usually used as a filter for water purification. However, even though this ceramic product is easy to mold to any kinds of shapes, the activity of activation constituents is reduced.

Also, a couple of patents for far-IR ceramics are introduced in Korean Pat. No. 96-22326, which mention preparation of ceramics, comprising the steps of: mixing powders of loess, clay, and Maek-Ban Stone which radiates far IR spontaneously, and mixing with an artemisia, an oriental medicine herb, to obtain far-IR radiating powders; and in Korean Pat. No. 97-59144, mixing soft sericite, alumina, and Maek-Ban Stone and pulverizing and sintering it, and pulverizing again at a proper size, adding sulfur and salt, and secondary sintering at 1500–1600° C. for 48–72 hours, again pulverizing it in 500 mesh to obtain the final ceramic product. In addition, Japanese Pat. No. Sho 53-44928 and Korean Pat. No. 98-2434 and No. 92-14735 all have some efficiency problems due to use of pulverized natural Maek-Ban Stone and a soft sericite without a treatment or with materials reducing an activity of activation constituents.

DISCLOSURE OF THE INVENTION

The purpose of this invention is to solve the above problems and to prepare excellent ceramics providing a high degree of food freshness. Another purpose of this invention is to provide the ceramics with a deodorizing effect and a water purification effect.

BEST MODE FOR CARRYING OUT THE INVENTION

The method according to the present invention for preparing ceramics comprises the steps of: adding water to the mixture of Maek-Ban Stone and soft sericite and maturing it at a room temperature for 1–5 days; compressing and molding it; sintering for 4–6 hours at 720–790° C.; pulverizing it into powder at the size of 230–550 mesh; irradiating the powder with 800–1,200 gauss of magnetic field; adding 10–40 parts by weight of tourmaline, and 10–20 parts by weight of sepiolite powder to 100 parts by weight of the magnetized ceramic powder obtained and stirring; compressing and molding it; sintering for 1–5 hours at 600–690° C.; pulverizing into powder at the size of 200–500 mesh; and irradiating it with 1,200–1,400 gauss of magnetic field.

Also, another method for preparing the ceramic product is that of adding water to the magnetized and sintered ceramic powder and compressing/molding and sintering it at 400–600° C. to be solidified and then also adding an affinity material with a living body such as loess or clay as a bonding agent and molding and drying.

Hereafter, the present invention is explained in detail.

Maek-Ban Stone and soft sericite, which are found in and around Pohang City of South Korea, consist of silicic acid anhydride and aluminum oxide as a major constituent and are well known as natural ores containing various kinds of minerals for improving the growth of plants as well as activating a metabolism of human body; these materials are used in the present invention. For the application of water treatment, they have a function of water purification by ion exchanging and absorption of the water and provide water containing minerals as a result of mineral elution. To enhance efficiency of the ion exchanging or absorption, the size of 250–350 mesh is preferred and the proper mixing ratio is 60–70% by weight (hereafter, "% by weight" is abbreviated to "%") of Maek-Ban Stone and 30–40% of soft sericite.

Tourmaline, a mineral stone consisting of cyclo silicate including Boron, has electrical properties of piezoelectricity and pyroelectricity and also has various colors such as earthlike, blue earthlike, dark brown, blue, green, red and pink. The piezoelectricity is an electrical phenomenon wherein an electrical polarization occurs in the symmetrical crystal, which has a defect in the middle of crystal, when this crystal is subjected to pressure at a specific direction. Pyroelectricity is another electrical phenomenon wherein opposite electrification occurs at each end of the polar axes of the crystal, when the crystal is subjected to a temperature variation.

It is inferred that a tourmaline might be an ion crystal having both positive and negative electric charges because it shows a special electrical phenomenon depending on the temperature. The lattice of common ion crystal is regularly arranged but the lattice of tourmaline is distorted. It is called a spontaneous distortion. In case of an ion crystal having an electric charge, its lattice distortion induces a distorted vibration pattern and affects the emitted electrons and, therefore, it loses its neutral state and shows different electric charges.

Due to the above reason, when polar substances are put into an electric field, electric polarization occurs and consequently, a static electricity is generated. As receiving an electromagnetic wave radiated from the sun, so they permanently emit subtle electric charge and the accumulation of these electrical charges raises a temperature. Since the hydroxyl ion($H_3O_2^-$) is produced by the electrolysis of water, it activates water. In addition, by removing bad smells from the air, it helps human metabolism.

A Sepiolite is a fiber substance consisting of $Si_{12}MgO_3O(OH_2)_4 \cdot 8H_2O$ and having an octahedral structure with magnesium in the middle of the square. Because this fiber substance has many tiny holes, contrary to a clay, it can absorb water in amounts up to 20 times its weight, and has many different kinds of geometrical structures which absorb harmful substances from the air. The mixture of 100 parts by weight of magnetized and sintered ceramic product, 10–40 parts by weight of tourmaline powder, and 10–20 parts by weight of sepiolite powder can provide many functions such as an ionization, an electrical phenomenon, absorption, and adsorption.

The magnetized and sintered ceramic powder above described is prepared at the preferable size of 230–550 mesh, as it is not easy to stir and mix above this size.

In case of below 10 parts by weight of tourmaline in this ceramic powder, as the spontaneous distortion decreases and consequently loses its electrical properties, the hydroxyl ion ($H_3O_2^-$) can not be produced and so water can not be activated. In case of over 40 parts by weight, it is difficult to mix with other materials.

In case of below 10 parts by weight of sepiolite, absorption or adsorption does not occur, thus the effects of deodorizing and sterilizing decrease. In case of over 20 parts by weight of sepiolite, the adsorption and absorption occur effectively but mixing with other materials becomes difficult.

Furthermore, in case of sintering at 600–690° C., the intrinsic physical and chemical properties of mineral materials are maintained, but over this sintering temperature range, defects occur such as loss of crystal water, color change by UV, and decrease in adsorption and absorption.

The reason for magnetic irradiation followed by sintering, is that recovering of physical and chemical defects during sintering and the magnetized ceramics can generate much more far-IR and more minerals resulting in improvement of the bio activation over conventional ceramic products.

The ceramic powder obtained can be used directly or added to synthetic resin for the use. To obtain molded products, loess or clay, which does not decrease the activation of active materials, is preferred as a binding agent. Another method to solidify is that of adding water to the ceramic powder and compressing/molding and sintering it at 400–600° C. Over the above mentioned sintering temperature, the activation of ceramics might be decreased.

Examples of this invention are as follows. The composition of Maek-Ban Stone is as follows.

| silicic anhydride | 69.8% by weight |
|---|---|
| $Al_2O_3$ | 14% by weight |
| FeO | 1.3% by weight |
| $FeO_2$ | 1.4% by weight |
| Mg | 3.6% by weight |
| CaO | 2.0% by weight |
| Na | 3.2% by weight |
| K | 3.2% by weight |
| Ti | 0.3% by weight |
| Phosphoric anhydride | 0.3 % by weight |
| $MnO_2$ | 0.02% by weight |

The composition of soft sericite is as follows.

| Silicic anhydride | 48.9% by weight |
|---|---|
| $Al_2O_3$ | 31.0% by weight |
| $FeO/FeO_2$ | 5.0% by weight |
| $K_2O$ | 7.3% by weight |
| Na | 0.23% by weight |

PREPARATION EXAMPLE

Process 1

65% of Maek-Ban Stone and 35% of soft sericite made up with above mentioned composition are pulverized at the size of 325 mesh and mixed; adding proper amount of water and stirring for two hours; compressing/molding and drying it at 150° C. for 24 hours; sintering at 720–790° C. for three hours.

Process 2

The sintered product obtained in Process 1, pulverized at the size of 230–550 mesh and irradiated with a magnetic field of 1,100 gauss.

Process 3

Mixing 100 parts by weight of the magnetized and sintered ceramic powder obtained in Process 2 with 30 parts by weight of tourmaline powder and 15 parts by weight of sepiolite powder and stirring in proper amount of water; compressing/molding; sintering at 680° C. for two hours; pulverizing at the size of 350 mesh; and irradiating with 1,400 gauss of magnetic field.

Process 4

Adding water to the magnetized and sintered ceramic powder obtained in Process 3 to be 22% of water content; compressing out to obtain spherical ceramics in 3 cm of diameter; sintering at 500° C. for an hour.

EXAMPLE I

The test result for food freshness using the ceramic powder obtained in Process 3 is as follows.

Each of two similar strawberries were kept in paper boxes (30×28×23 cm) containing log of the magnetized and sintered ceramic powder and without the ceramic powder, respectively, at room temperature (15–22° C.) for a week. The strawberry without the ceramic powder became totally rotten but the strawberry containing the ceramic powder showed only a little damage on the skin of the strawberry.

EXAMPLE II

The test result for deodorizing effect of the ceramic powder obtained in the Process 3 of Preparation Example is as follows.

The result of smell detection each month in a 500L refrigerator containing the magnetized and sintered ceramic powder is in Table 1.

TABLE 1

| Ceramic Weight (Kg) Period | 0.5 | 1.0 | 1.5 | 2.0 |
|---|---|---|---|---|
| 1 month | No smell | no smell | No smell | no smell |
| 2 months | Little smelly | no smell | No smell | no smell |
| 3 months | Smelly | Little smelly | No smell | no smell |

EXAMPLE III

The test result for water purification of spherical ceramics obtained in Process 4 is as follows.

The results of analyzing the original tap water and the tap water containing 0.1% of spherical ceramics for 24 hours are as follows.

TABLE II

Analyzed data for purified water filtered by the ceramic of the present invention.

| Inspection Item | Standard | Result |
|---|---|---|
| 1. Common Bacteria | Below 100 CFU/ml | 0 |
| 2. E. Coli | Negative/50 ml | Negative |
| 3. Pb | Below 0.05 mg/l | 0.00 mg/l |
| 4. F | Below 1.5 mg/l | 0.0 mg |
| 5. As | Below 0.05 mg/l | 0.000 mg/l |
| 6. Ce | Below 0.01 mg/l | 0.000 mg/l |
| 7. Hg | Not detected | 0.000 mg/l |
| 8. $(CN)_2$ | Not detected | 0.00 mg/l |
| 9. $Cr^{6+}$ | Below 0.05 mg/l | 0.00 mg/l |
| 10. Ammoniac nitrogen | Below 0.5 mg/l | 5.66 mg/l |
| 11. Nitric acidic nitrogen | Below 10 mg/l | 1.4 mg/l |
| 12. Cd | 0.01 mg/l | 0.000 mg/l |
| 13. Phenol | Below 0.005 mg/l | 0.000 mg/l |
| 14. Trihalomethane | Below 0.1 mg/l | — |
| 15. Diazinone | Below 0.02 mg/l | 0.000 mg/l |
| 16. Parathion | 0.06 mg/l | 0.000 mg/l |
| 17. Malathion | Below 0.25 mg/l | 0.000 mg/l |
| 18. Fernitrothion | Below 0.04 mg/l | 0.000 mg/l |
| 19. Carbamyl | Below 0.07 mg/l | 0.000 mg/l |
| 20. 1.1.1-trichloroethane | Below 0.1 mg/l | 0.000 mg/l |
| 21. Tetra-chloroethylene | Below 0.01 mg/l | 0.000 mg/l |
| 22. Trichloro-ethylene | Below 0.03 mg/l | 0.000 mg/l |
| 23. Dichloro-methane | Below 0.02 mg/l | 0.000 mg/l |
| 24. Benzene | Below 0.01 mg/l | 0.000 mg/l |
| 25. Toluene | Below 0.7 mg/l | 0.000 mg/l |
| 26. Ethylbenzene | Below 0.3 mg/l | 0.000 mg/l |
| 27. Xylene | Below 0.5 mg/l | 0.000 mg/l |
| 28. Hardness | Below 300 mg/l | 56 mg/l |
| 29. Amount of $KMnO_4$ Consumption | Below 10 mg/l | 1.6 mg/l |
| 30. Smell | No | Suitable |
| 31. Taste | No | Suitable |
| 32. Copper | Below 1 mg/l | 0.00 mg/l |
| 33. Color Tint | Below 5 | 0 |
| 34. Detergent (Anion Surfactant) | Below 0.5 mg/l | 0.0 mg/l |
| 35. Hydrogen ion Concentration | 5–8–8.5 | 8.5 |
| 36. Zn | Below 1 mg/l | 0.09 mg/l |
| 37. Chloric ion | Below 150 mg/l | 10 mg/l |
| 38. Evaporation Residue | Below 500 mg/l | 174 mg/l |
| 39. Fe | Below 0.3 mg/l | 0.00 mg/l |
| 40. Mn | Below 0.3 mg/l | 0.00 mg/l |
| 41. Turbidity | Below 2 degree | Suitable |
| 42. Sulfate ion | Below 200 mg/l | 23 mg/l |
| 43. Al | Below 0.2 mg/l | 0.00 mg/l |
| Decision | | Suitable |

TABLE III

Analyzed Data for the untreated tap water.

| Inspection Item | Standard | Result |
|---|---|---|
| 1. Common Bacteria | Below 100 CFU/ml | 0 |
| 2. E. Coli | Negative/50 ml | Negative |
| 3. Pb | Below 0.05 mg/l | 0.00 mg/l |
| 4. F | Below 1.5 mg/l | 0.0 mg |
| 5. As | Below 0.05 mg/l | 0.000 mg/l |
| 6. Ce | Below 0.01 mg/l | 0.000 mg/l |
| 7. Hg | Not detected | 0.000 mg/l |
| 8. $(CN)_2$ | Not detected | 0.00 mg/l |
| 9. $Cr^{6+}$ | Below 0.05 mg/l | 0.00 mg/l |
| 10. Ammoniac nitrogen | Below 0.5 mg/l | 5.66 mg/l |
| 11. Nitric acidic nitrogen | Below 10 mg/l | 1.4 mg/l |
| 12. Cd | 0.01 mg/l | 0.000 mg/l |
| 13. Phenol | Below 0.005 mg/l | 0.000 mg/l |
| 14. Trihalomethane | Below 0.1 mg/l | — |
| 15. Diazinone | Below 0.02 mg/l | 0.000 mg/l |
| 16. Parathion | 0.06 mg/l | 0.000 mg/l |
| 17. Malathion | Below 0.25 mg/l | 0.000 mg/l |
| 18. Fernitrothion | Below 0.04 mg/l | 0.000 mg/l |
| 19. Carbamyl | Below 0.7 mg/l | 0.000 mg/l |
| 20. 1.1.-trichloro-ethane | Below 0.1 mg/l | 0.000 mg/l |
| 21. Tetrachloro-ethylene | Below 0.01 mg/l | 0.000 mg/l |
| 22. Trichloro-ethylene | Below 0.03 mg/l | 0.000 mg/l |
| 23. Dichloro-methane | Below 0.02 mg/l | 0.000 mg/l |
| 24. Benzene | Below 0.01 mg/l | 0.000 mg/l |
| 25. Toluene | Below 0.7 mg/l | 0.000 mg/l |
| 26. Ethylbenzene | Below 0.3 mg/l | 0.000 mg/l |
| 27. Xylene | Below 0.5 mg/l | 0.000 mg/l |
| 28. Hardness | Below 300 mg/l | 56 mg/l |
| 29. Amount of $KMnO_4$ Consumption | Below 10 mg/l | 1.9 mg/l |
| 30. Smell | No | Suitable |
| 31. Taste | No | Suitable |
| 32. Copper | Below 1 mg/l | 0.00 mg/l |
| 33. Color Tint | Below 5 | 2 |
| 34. Detergent (Anion Surfactant) | Below 0.5 mg/l | 0.0 mg/l |
| 35. Hydrogen ion Concentration | 5.8–8.5 | 7.7 |
| 36. Zn | Below 1 mg/l | 1.00 mg/l |
| 37. Chloric ion | Below 150 mg/l | 1.00 mg/l |
| 38. Evaporation Residue | Below 500 mg/l | 791 mg/l |
| 39. Fe | Below 0.3 mg/l | 0.19 mg/l |
| 40. Mn | Below 0.3 mg/l | 0.03 mg/l |
| 41. Turbidity | Below 2 | 8 |
| 42. Sulfate ion | Below 200 mg/l | 23 mg/l |
| 43. Al | Below 0.2 mg/l | 0.00 mg/l |
| Decision | | Not Suitable |
| Remarks | | Exceeded standard; ammoniac nitrogen, turbidity, evaporation residue |

As shown in Tables II and III, the content of Ammoniac Nitrogen, evaporation residue, and clearness for the untreated tap water exceeded the standard but the treated tap water with the magnetized and sintered ceramic powder of this present invention is suitable for the standard values of drinking water.

INDUSTRIAL APPLICABILITY

As observed in above examples, the magnetized and sintered ceramic powder of the present invention has application for keeping food fresh, deodorization, water purification, mineral elution, and enhancement of human metabolism. Therefore, it can be used in various fields of industry such as health care, food, apparel, and paper. It is intended for the present invention to be used as a sewage purification agent, plant growth substance, and metabolism accelerator; the present invention may also be applied to beverages and alcohol, soap or cosmetics, wrapping paper and wall coverings, food containers, and interior materials, and may also act as a purification agent for automobile exhaust fumes.

What is claimed is:

1. A method for preparing a multi-purpose magnetized and sintered ceramic powder, comprising the steps of:

adding water to a mixture of Maek-Ban Stone and soft sericite and stirring to form a second mixture;

maturing the second mixture for 1–5 days at room temperature and compressing and molding;

sintering at 720–790° C. for 4–6 hours;

pulverizing to a size of 230–550 mesh to obtain a first powder;

irradiating the first powder with a magnetic field of 800–1,200 gauss;

mixing 100 parts by weight of the obtained ceramic powder with 10–40 parts by weight of tourmaline and 10–20 parts by weight of sepiolite powder to form a third mixture;

compressing/molding the third mixture and again sintering at 600–690° C. for 1–5 hours;

pulverizing to a size of 200–500 mesh to obtain a second powder; and irradiating the second powder with a magnetic field of 1,200–1,400 gauss.

2. The method in accordance with claim 1, in which the size of the mixture of Maek-Ban Stone and soft sericite is 250–350 mesh.

3. The method in accordance with claim 1, in which a composition of Maek-Ban Stone and soft sericite is 60–70% by weight and 30–40% by weight, respectively is used.

4. The method as set forth in claim 1, further comprising the steps of preparing multi-purpose magnetized and sintered ceramics from the second ceramic powder by adding water and compressing and molding followed by sintering at 400–600° C.

* * * * *

UNITED STATES PATENT AND TRADEMARK OFFICE
CERTIFICATE OF CORRECTION

PATENT NO. : 6,264,875 B1  Page 1 of 1
DATED : July 24, 2001
INVENTOR(S) : Sang-Yool Pyun It is certified that error appears in the above-identified patent and that said Letters Patent is hereby corrected as shown below:

Title page,
Item [76] correct the surname of the inventor: "PYUN" to -- BYUN --

Signed and Sealed this

Fourteenth Day of May, 2002

Attest:

JAMES E. ROGAN
Attesting Officer  *Director of the United States Patent and Trademark Office*